United States Patent
Cooney et al.

(10) Patent No.: US 11,677,774 B2
(45) Date of Patent: Jun. 13, 2023

(54) INTERACTIVE WEB APPLICATION SCANNING

(71) Applicant: Tenable, Inc., Columbia, MD (US)

(72) Inventors: Fergus Cooney, Etobicoke (CA); Greg Kuruc, Baltimore, MD (US)

(73) Assignee: Tenable, Inc., Columbia, MD (US)

( * ) Notice: Subject to any disclaimer, the term of this patent is extended or adjusted under 35 U.S.C. 154(b) by 213 days.

(21) Appl. No.: 16/796,612

(22) Filed: Feb. 20, 2020

(65) Prior Publication Data

US 2021/0211453 A1 Jul. 8, 2021

Related U.S. Application Data

(60) Provisional application No. 62/957,706, filed on Jan. 6, 2020.

(51) Int. Cl.
*H04L 9/40* (2022.01)
*G06F 16/958* (2019.01)
*G06F 21/57* (2013.01)

(52) U.S. Cl.
CPC ........ *H04L 63/1433* (2013.01); *G06F 16/958* (2019.01); *G06F 21/577* (2013.01)

(58) Field of Classification Search
CPC . H04L 63/1433; G06F 16/958; G06F 21/577; G06F 2221/034
See application file for complete search history.

(56) References Cited

U.S. PATENT DOCUMENTS

| | | | | |
|---|---|---|---|---|
| 9,106,690 | B1 * | 8/2015 | Banga | G06F 21/53 |
| 9,906,553 | B1 * | 2/2018 | Ainslie | H04L 63/1458 |
| 2006/0161988 | A1 * | 7/2006 | Costea | G06F 21/64 |
| | | | | 726/25 |
| 2006/0242694 | A1 * | 10/2006 | Gold | H04L 63/1441 |
| | | | | 726/13 |
| 2007/0174324 | A1 * | 7/2007 | Palapudi | G06F 16/9566 |
| | | | | 707/E17.115 |
| 2013/0276126 | A1 * | 10/2013 | Zhou | H04L 63/1433 |
| | | | | 726/25 |
| 2017/0308513 | A1 * | 10/2017 | Hunt | G06F 16/958 |
| 2018/0349602 | A1 * | 12/2018 | Johns | G06F 21/552 |
| 2020/0351298 | A1 * | 11/2020 | Paturi | H04L 67/1095 |

FOREIGN PATENT DOCUMENTS

| | | | |
|---|---|---|---|
| CN | 108830082 A | 11/2018 | |
| CN | 109933980 A | 6/2019 | |

OTHER PUBLICATIONS

"Tenable.io Web Application Scanning" Copyright © 2019 Tenable, Inc. Oct. 8, 2019.

* cited by examiner

*Primary Examiner* — Meng Li
(74) *Attorney, Agent, or Firm* — Muncy, Geissler, Olds & Lowe, P.C.; Daniel Podhajny

(57) ABSTRACT

Techniques, methods and/or apparatuses are disclosed that enable facilitation of remediation of one or more vulnerabilities detected in a web application. Through the disclosed techniques, methods and/or apparatuses, users will be able to navigate to respective web pages of the detected vulnerabilities and snap directly to the vulnerabilities within the webpages. This allows the users to immediately know the location of the vulnerability, and inline feedback can be provided on the issue, including description, severity, solution and plugin outputs.

29 Claims, 12 Drawing Sheets

INTERACTIVE WEB APPLICATION SCANNING

CROSS-REFERENCE TO RELATED APPLICATIONS

The present application claims the benefit of U.S. Provisional Patent Application No. 62/957,706, entitled "INTERACTIVE WEB APPLICATION SCANNING," filed Jan. 6, 2020, the contents of which are hereby incorporated by reference in their entirety.

TECHNICAL FIELD

The various aspects and embodiments described herein generally relate to web application scanning (WAS), and more particularly to interactive displaying of vulnerabilities of web applications based on web application scanning to facilitate remediation of the web application vulnerabilities.

BACKGROUND

With increasing threats and a constantly changing information technology (IT) landscape, security teams today can barely keep up with the pace of identifying vulnerabilities and threats and, more importantly, fixing them. Furthermore, as more and more organizations embrace virtualization, the cloud, mobile, and collaboration and communication among software development and IT operations (sometimes called "DevOps"), the fundamental concept of an asset changes and radically impacts how and when organizations and security teams need to assess vulnerabilities.

One factor to asset-specific vulnerability assessments is a degree of threat associated with software vulnerabilities. Conventionally, assessing the degree of threat associated with software vulnerabilities is a manual and somewhat subjective process that attempts to rank software vulnerabilities by their associated degree of threat, and then allocate resources to fixing or remediating those software vulnerabilities in accordance with the rankings. More recently, algorithms for automatically predicting exploit development for particular software vulnerabilities have been developed, such as those described in U.S. application Ser. No. 15/827,943, entitled "EXPLOIT PREDICTION BASED ON MACHINE LEARNING". Such algorithms rely upon software vulnerability prevalence (i.e., the raw number of assets impacted by the respective software vulnerabilities) as a primary parameter for exploit development prediction.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment is directed to a method of facilitating remediation of one or more vulnerabilities detected in a web application. The method may comprise receiving information associated with the one or more detected vulnerabilities based on at least one remote vulnerability scan of a web application implemented within one or more web pages of a web site by one or more scanning agents. The method may further comprise, for each vulnerability of the one or more detected vulnerabilities, navigating to a respective web page that contains the vulnerability based on the received information, and snapping directly to the vulnerability within the respective web page based on the received information.

Another embodiment is also directed to a method of facilitating remediation of one or more vulnerabilities detected in a web application. The method may comprise identifying the one or more vulnerabilities in the web application based on at least one remote vulnerability scan of the web application implemented within one or more web pages of a web site by one or more scanning agents. The method may also comprise generating information configured to permit a target device, for each of the one or more detected vulnerabilities, to (i) navigate to a respective web page that contains the vulnerability, and (ii) snap directly to the vulnerability within the respective web page. The method may further comprise providing the information to the target device.

Another embodiment is directed to an apparatus configured to facilitate remediation of one or more vulnerabilities detected in a web application. The apparatus may comprise a memory and at least one processor coupled to the memory. The at least one processor and the memory may be configured to receive information associated with the one or more vulnerabilities detected in the web application based on at least one remote vulnerability scan of a web application implemented within a web page of a web site by one or more scanning agents. The at least one processor and the memory may also be configured to, for each vulnerability of the one or more detected vulnerabilities, navigate to a respective web page that contains the vulnerability based on the received information, and snap directly to the vulnerability within the respective web page based on the received information.

Another embodiment is directed to an apparatus configured to facilitate remediation of one or more vulnerabilities detected in a web application. The apparatus may comprise a memory and at least one processor coupled to the memory. The at least one processor and the memory may be configured to identify the one or more vulnerabilities in the web application based on at least one remote vulnerability scan of the web application implemented within one or more web pages of a web site by one or more scanning agents. The at least one processor and the memory may also be configured to generate information configured to permit a target device, for each of the one or more detected vulnerabilities, to (i) navigate to a respective web page that contains the vulnerability, and (ii) snap directly to the vulnerability within the respective web page. The at least one processor and the memory may further be configured to provide the information to the target device.

Another embodiment is directed to an apparatus configured to facilitate remediation of one or more vulnerabilities detected in a web application. The apparatus may comprise means for receiving information associated with the one or more detected vulnerabilities based on at least one remote vulnerability scan of a web application implemented within one or more web pages of a web site by one or more scanning agents. The apparatus may also comprise means for navigating, for each vulnerability of the one or more detected vulnerabilities, to a respective web page that contains the vulnerability based on the received information. The apparatus may further comprise means for snapping, for each vulnerability of the one or more detected vulnerabilities, directly to the vulnerability within the respective web page based on the received information.

Another embodiment is directed to an apparatus configured to facilitate remediation of one or more vulnerabilities detected in a web application. The apparatus may comprise means for identifying the one or more vulnerabilities in the web application based on at least one remote vulnerability scan of the web application implemented within one or more web pages of a web site by one or more scanning agents. The apparatus may also comprise means for generating information configured to permit a target device, for each of the one or more detected vulnerabilities, to (i) navigate to a respective web page that contains the vulnerability, and (ii) snap directly to the vulnerability within the respective web page. The apparatus may further comprise means for providing the information to the target device.

Another embodiment is directed to a non-transitory computer-readable medium storing computer-executable instructions for an apparatus configured to facilitate remediation of one or more vulnerabilities detected in a web application. The computer-executable instructions may comprise one or more instructions causing the apparatus to receive information associated with the one or more detected vulnerabilities based on at least one remote vulnerability scan of a web application implemented within one or more web pages of a web site by one or more scanning agents. The computer-executable instructions may also comprise one or more instructions causing the apparatus to, for each vulnerability of the one or more detected vulnerabilities, navigate to a respective web page that contains the vulnerability based on the received information, and snap directly to the vulnerability within the respective web page based on the received information.

Another embodiment is directed to a non-transitory computer-readable medium storing computer-executable instructions for an apparatus configured to facilitate remediation of one or more vulnerabilities detected in a web application. The computer-executable instructions may comprise one or more instruction causing the apparatus to identify the one or more vulnerabilities in the web application based on at least one remote vulnerability scan of the web application implemented within one or more web pages of a web site by one or more scanning agents. The computer-executable instructions may also comprise one or more instruction causing the apparatus to generate information configured to permit a target device, for each of the one or more detected vulnerabilities, to (i) navigate to a respective web page that contains the vulnerability, and (ii) snap directly to the vulnerability within the respective web page. The computer-executable instructions may further comprise one or more instruction causing the apparatus to provide the information to the target device.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
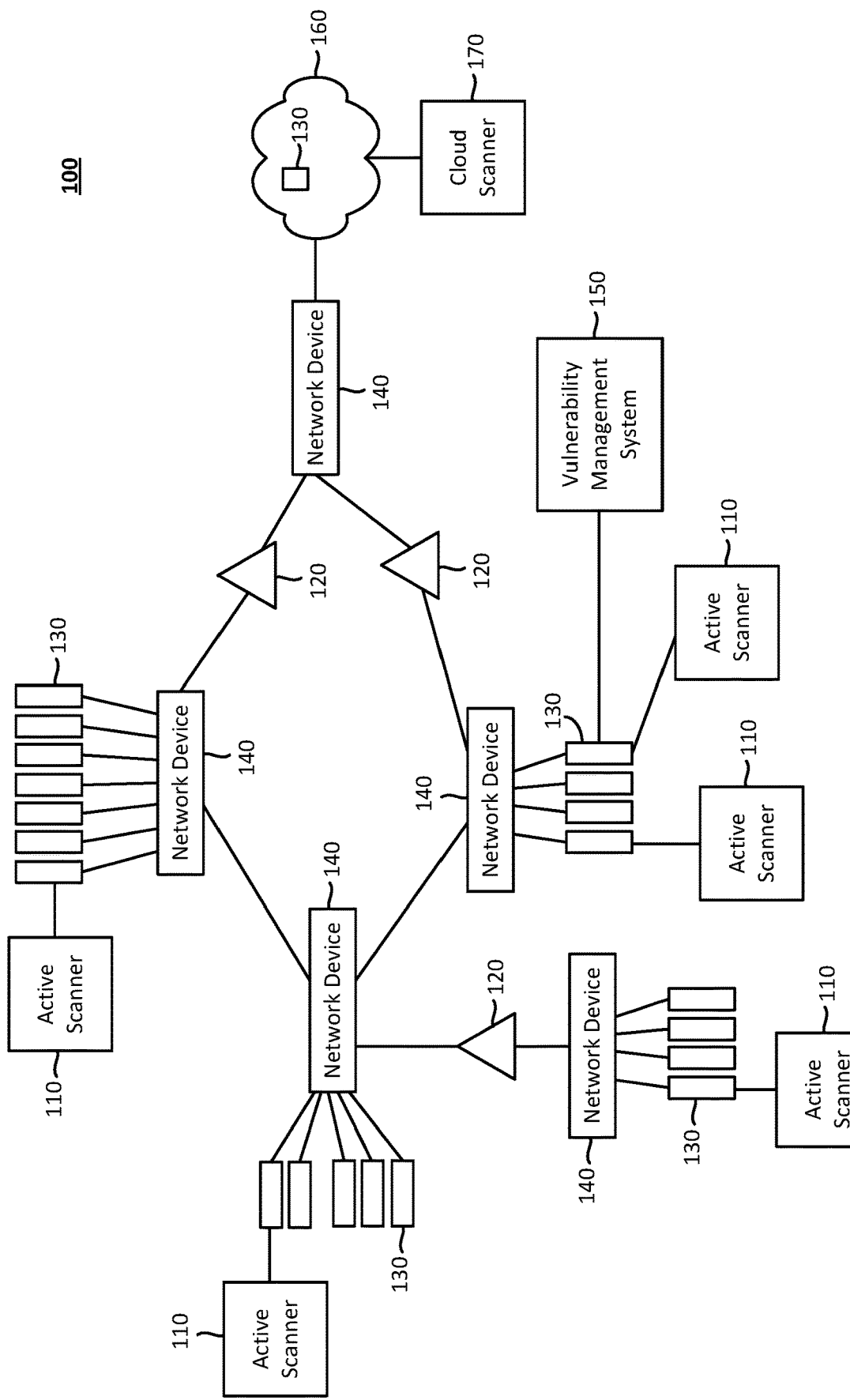
FIG. 1 illustrates an exemplary network having various assets that can be managed using a vulnerability management system, according to various aspects of the disclosure.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
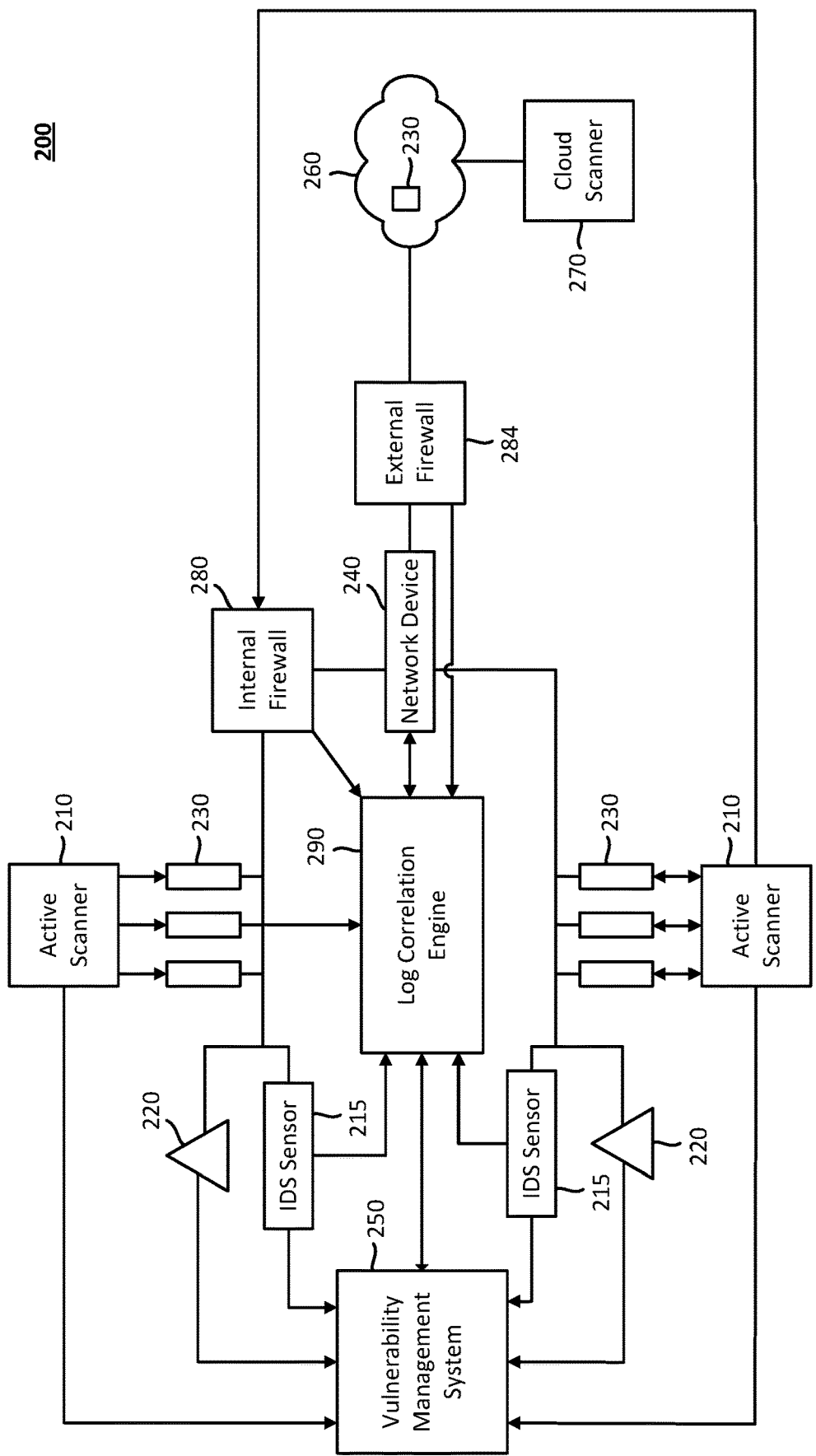
FIG. 2 illustrates another exemplary network having various assets that can be managed using a vulnerability management system, according to various aspects of the disclosure.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS sensor 215 may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

Existing ways to view such vulnerabilities allow a high-level view of flaws in an application. For example, the identified vulnerabilities may be provided in a table format. For example, a high level view of web applications may be presented along with vulnerabilities and/or other issues affecting the applications. However, such views can come across as abstract and may not provide to users a nice personal touch that's individual to their application. Users may not get a sense of where in the application the problem is and potentially, and who is responsible for fixing the vulnerabilities. For training, education, and just efficiency of explaining to management the issue at hand, it's often not enough to just show a list.

To address such issues, it is proposed to enhance user engagement with security issues by locating, highlighting and explaining security problems on their own webpages. In this way, the vulnerabilities can be made clear and the associated dangers cay be explained in a user friendly fashion.

Being able to highlight security problems on the target website at the click of a button drastically enhances the user engagement with security issues by locating, highlighting and explaining security problems on their own webpages, making the vulnerabilities clear, obvious and explaining the dangers in place in a user friendly fashion. One of the objectives (of which there can be several) is to allow users to visualize the vulnerable parts of their applications directly on their site by pulling up the page and snapping to and highlighting the vulnerable element. This allows the users to immediately know the location of the vulnerability, and inline feedback can be provided on the issue, including description, severity, solution and plugin output.

Figure 3:
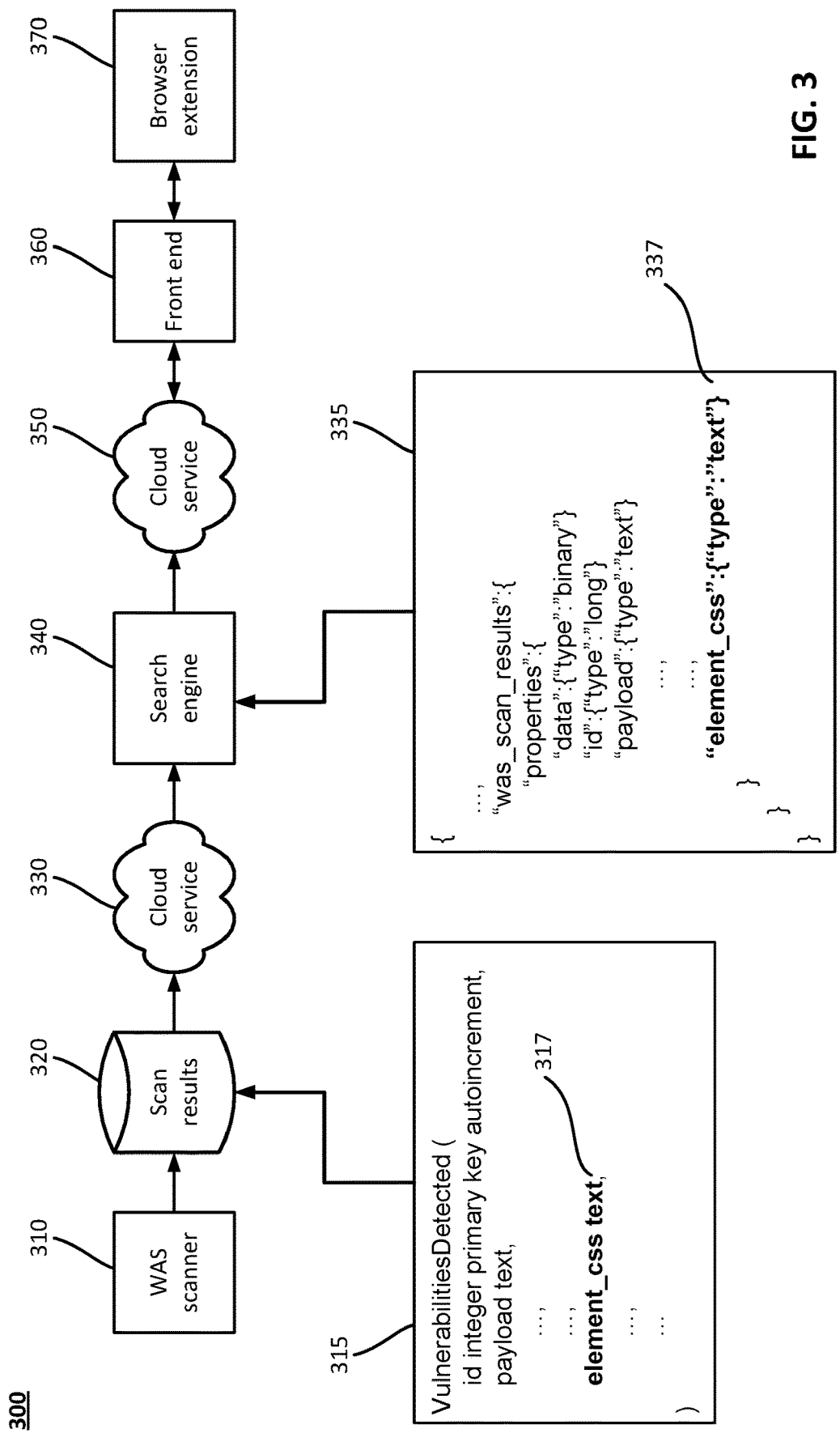
FIG. 3 illustrates an exemplary system suitable for interactive remediation of vulnerabilities of web applications, according to various aspects of the disclosure.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links bark to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, the it is seen that in the "was_scan_results" 335 data includes the element selector data 337, which is denoted as "element_css": {"type":"text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET/scans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

URL
Element selector
Plugin ID

The browser extension 370 may be configured to take the message passed from the front end 360, open the URL, and highlight and snap to the vulnerable element. In an aspect, the browser extension 370 may open the URL in a new tab of the browser.

Figure 4:
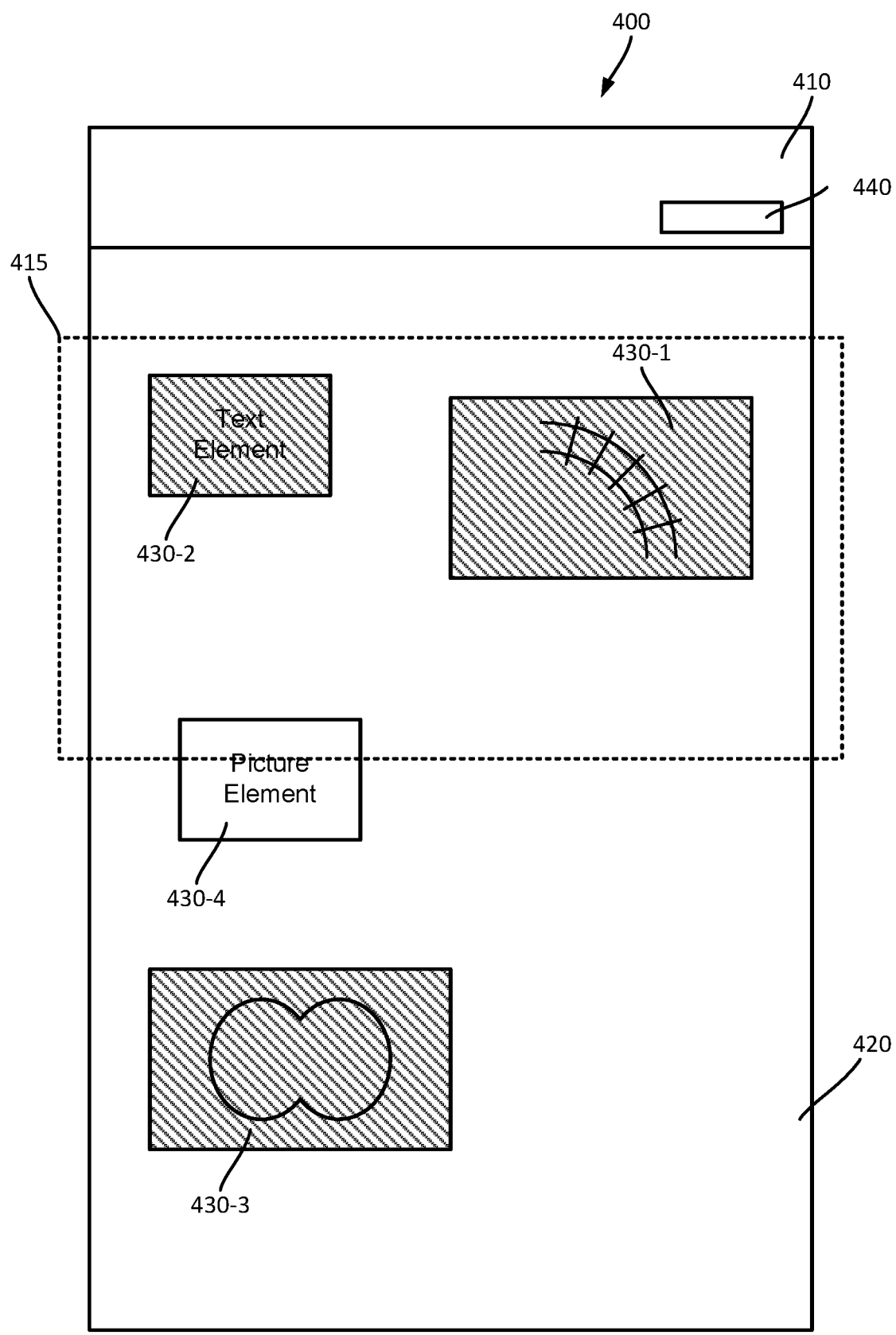
FIGS. 4-6 illustrate example browser interface displaying of web pages for interactive remediation of vulnerabilities of web applications, according to various aspects of the disclosure.

FIG. 4 illustrates an example of a browser interface 400 displaying of a web page of a website for interactive remediation of vulnerabilities of web applications. As seen, the browser and/or a browser extension may be configured to display a top portion 410 that may include items such as a menu bar, an address box, a search box, tabs (e.g., for tabbed pages), a bookmark bar, a toolbar, etc. which are not illustrated so as to reduce clutter. The top portion 410 may not be scrollable.

The browser and/or a browser extension may also be configured to display a web page 420 of a web site within the browser interface 400. The web page 420, which may be scrollable (e.g., when the web page 420 is bigger than a physical display used to display the browser interface 400), may include one or more web application elements (e.g., links, plugins, etc.) 430-1, 430-2, 430-3, 430-4 (collectively or individually "web application elements"). While four web application elements 430 (or simply "elements") are shown, there can be any number of such elements 430. A dashed box 415 indicates a portion of the web page 420 that is currently in view within the browser interface 400, i.e., within the view of the physical display used to display the browser interface 400.

In FIG. 4, it may also be assumed that the web page 420 has been scanned by one or more scanning agents (e.g., one or more WAS scanner). Examples of such scanning agents may include any of the cloud scanners 170, 270, active scanners 110, 210, and/or passive scanners 120, 220, WAS scanner 310, of FIGS. 1-3. In this particular instance, the scanning results indicate that three of the web application elements 430 have been detected to be vulnerable, e.g., to attacks.

The browser and/or the browser extension may be configured to navigate to the web page that contain the detected vulnerabilities and snap directly to each of the detected vulnerability within the respective web pages. For example, scripts (XML, HTML, java, css, etc.) may be generated and/or executed. Each of the detected vulnerabilities (detected vulnerable elements 430) may be highlighted (indicated with diagonal hashes). Unless otherwise indicated, terms "vulnerabilities" and "vulnerable elements" may be used interchangeably. In this instance, elements 430-1, 430-2, and 430-3 are illustrated as the detected vulnerabilities. If no vulnerabilities are detected regarding an element, such as element 430-4, that element need not be highlighted. In this way, the user, e.g., site administrator, is able to visualize the vulnerable parts of the applications directly on their own site by pulling up the page and snapping to and highlighting the vulnerabilities 430.

Figure 5:
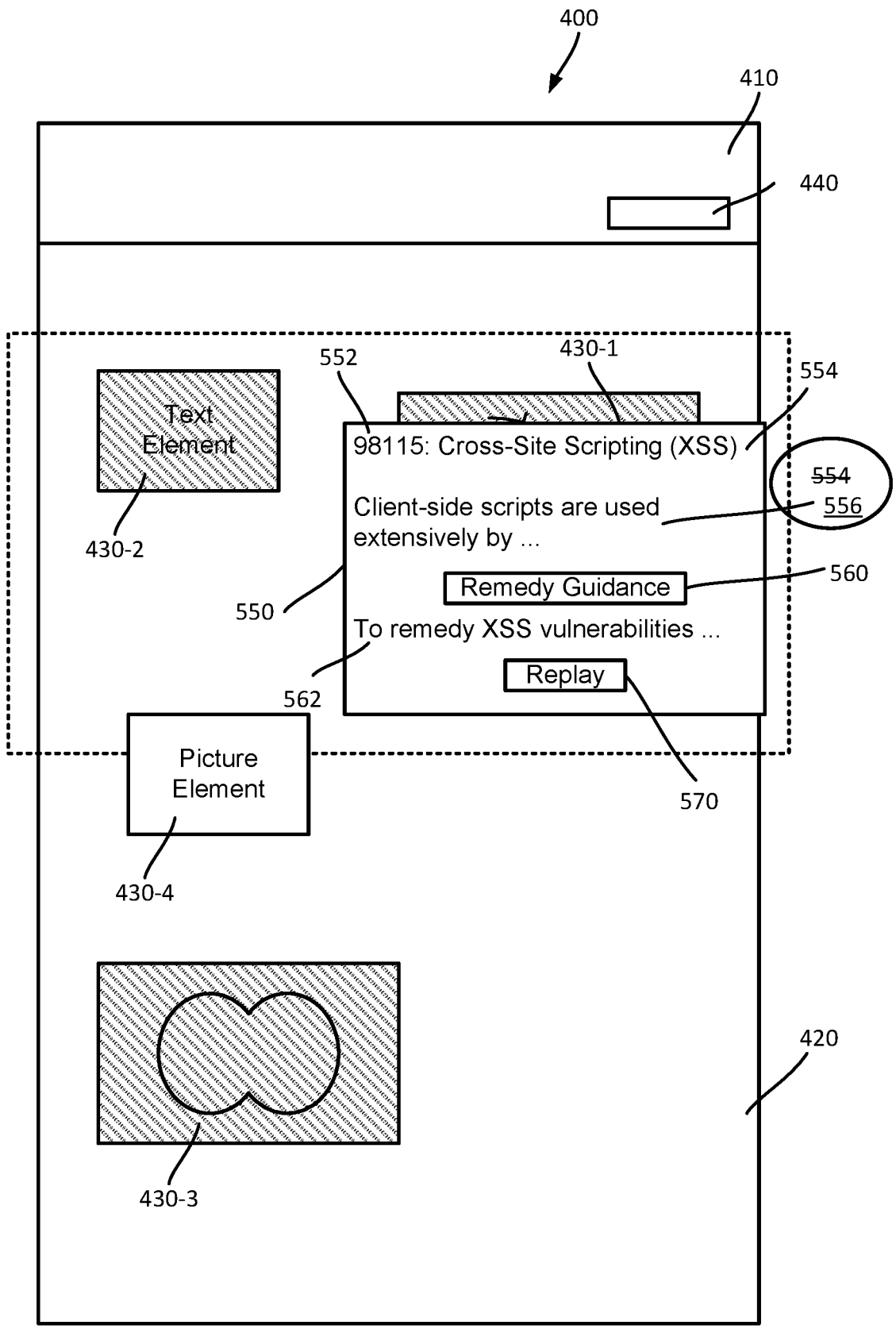

As a result, the user is able to know immediately the location of the vulnerability. Also, the browser and/or the browser extension may be configured to provide an inline feedback on the detected issue including description, severity, solution, and plugin output. In other words, some metadata associated with the vulnerable element may be provided. This is illustrated in FIG. 5 which shows a vulnerability box 550 (e.g., a pop-up box) that may pop-up if a cursor is hovered over a vulnerability such as the vulnerable element 430-1. The vulnerability box 550 may include a vulnerability ID 552, a vulnerability name 554, and a vulnerability description 556 associated with the vulnerable element 430. The browser and/or the browser extension may be configured to query for such metadata information from the second cloud service 350. For example, the browser front end may provide the element selector 317 to the second cloud service 350 for each vulnerability 430.

In an aspect, the browser and/or the browser extension may be configured to provide a remedy guidance button 560, which when clicked or otherwise activated by the user, may cause the browser and/or the browser extension to display a remedy description 562 to address the associated vulnerability. The remedy guidance button 560 may be provided within the vulnerability box 550. When the remedy guidance button 560 is clicked or otherwise activated by the user, the corresponding remedy description 562 may also be displayed within the vulnerability box 550. Again, the browser and/or the browser extension may be configured to query for the remedy description information from the second cloud service 350.

Note that unlike the conventional way of simply listing the vulnerabilities, the proposed technique enables the user, e.g., site administrator, to locate and highlight security problems and explanations thereof directly on the web pages themselves, i.e., on their own web pages. Also, the vulnerabilities can be made clear and the associated dangers cay be explained in a user friendly fashion.

In another aspect, the browser and/or the browser extension may be configured to provide a replay button 570, which when clicked or otherwise activated by the user, may cause the browser and/or the browser extension to replay the attack on the web page. For example, the replay may be implemented through scripting languages (e.g., Java, PHP, Perl, Javascript, Perl, Python, etc.). The site administrator may click the replay button 570 after taking one or more remedial actions (e.g., as provided in the remedy description 562). If the corrective actions have been taken regarding a particular element 430, then the particular element 430 may be de-highlighted, i.e., may no longer be highlighted. The replay button 570 may be provided within the vulnerability box 550.

Figure 6:
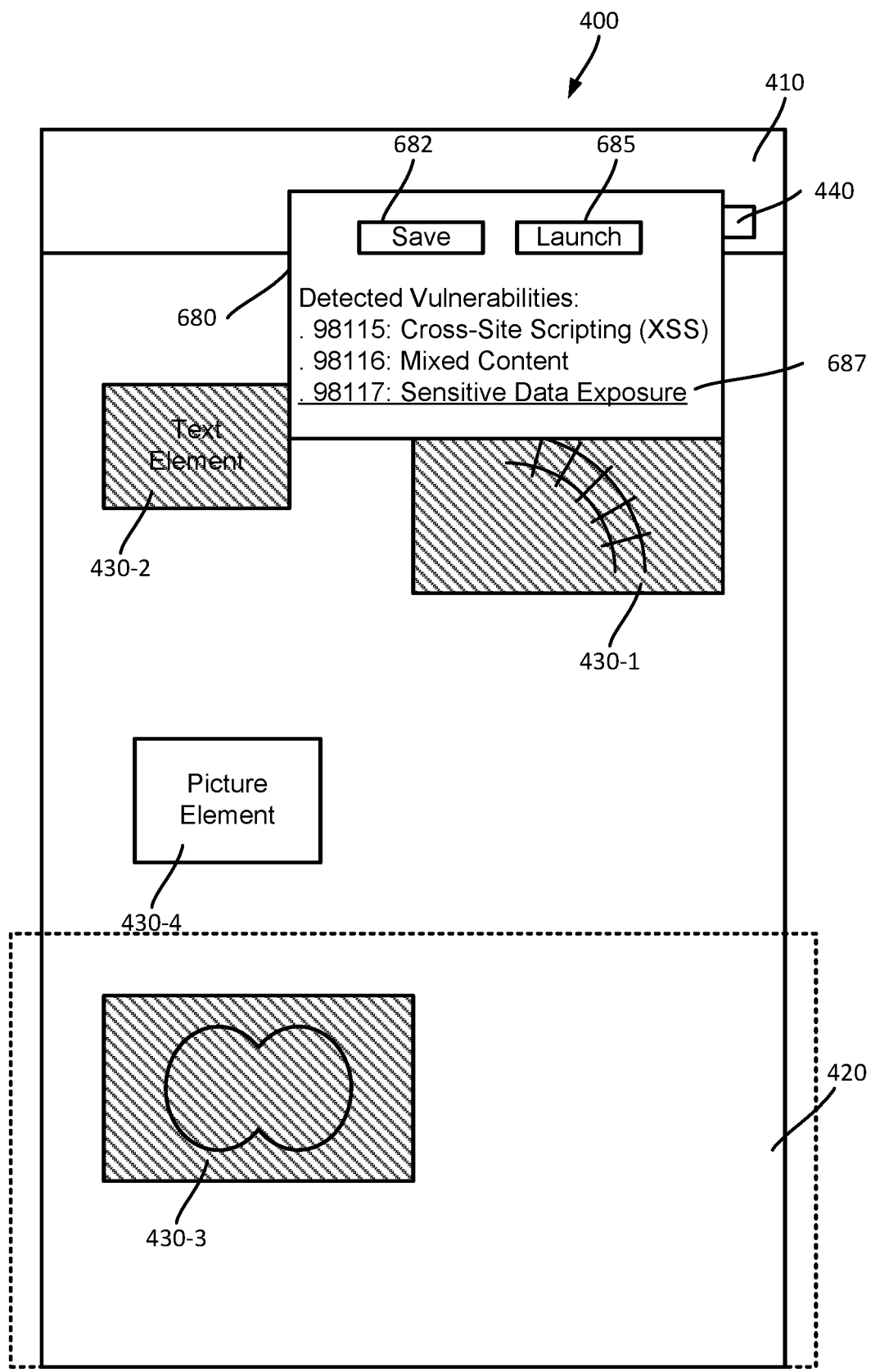

Note that there can be multiple detected vulnerable elements 430 in a web page, and some of them may not be in view currently. For example, in FIGS. 4 and 5, the vulnerable element 430-3 is not in view of the browser interface 400. The browser and/or the browser extension may be configured to provide a vulnerabilities button 440, e.g., within the top portion 410. As seen in FIG. 6, when the user clicks or otherwise activates the vulnerabilities button 440, the browser and/or the browser extension may be configured to provide a vulnerability page box 680, e.g., as a pop-up box. The vulnerability page box 680 may provide or otherwise display one or more vulnerability links 687 linked to the detected vulnerabilities (e.g., linked to the detected vulnerable elements 430). Each displayed vulnerability link 687 may include a vulnerability ID and/or a vulnerability name.

As the user hovers the cursor over one of the links, that link may be highlighted (e.g., through underline). The user may select a vulnerability (e.g., by clicking the highlighted vulnerability link 687), the browser and/or the browser extension may be configured to bring the selected vulnerability within the view of the browser interface 400. For example, in FIG. 6, it may be assumed that the user has selected the underlined vulnerability link 687 (with ID "98117") causing the browser and/or the browser extension to navigate to the web page containing the selected vulnerability and snap to the selected vulnerability such that the selected vulnerability is in view. That is, the browser and/or the browser extension changed the browser interface 400 to bring the corresponding vulnerable element 430-3 in view. While not shown, the user may then hover the cursor over the vulnerable element 430-3 causing the browser and/or the browser extension to show the vulnerability box 550, this time associated with the selected vulnerable element 430-3. Alternatively, the vulnerability box 550 associated with the selected vulnerable element 430-3 may be provided upon the user activating the corresponding vulnerable link 687 within the vulnerability page box 680.

In an aspect, the browser and/or the browser extension may be configured to provide a save button 682, which when clicked or otherwise activated by the user, may cause the browser and/or the browser extension to save the vulnerabilities of the web page. As an example, the save button may be provided within the vulnerability page box 680.

In another aspect, the browser and/or the browser extension may be configured to provide a scan launch button 685, which when clicked or otherwise activated by the user, may cause the web page 420 to be rescanned for vulnerabilities, e.g., by one or more scanning agents. For example, the site administrator may click the scan launch button 685 after taking one or more remedial actions (e.g., as provided in the remedy description 562). The scanning results may be viewed on the web page 420. As an example, the scan launch button 685 may be provided within the vulnerability page box 680.

Figure 7:
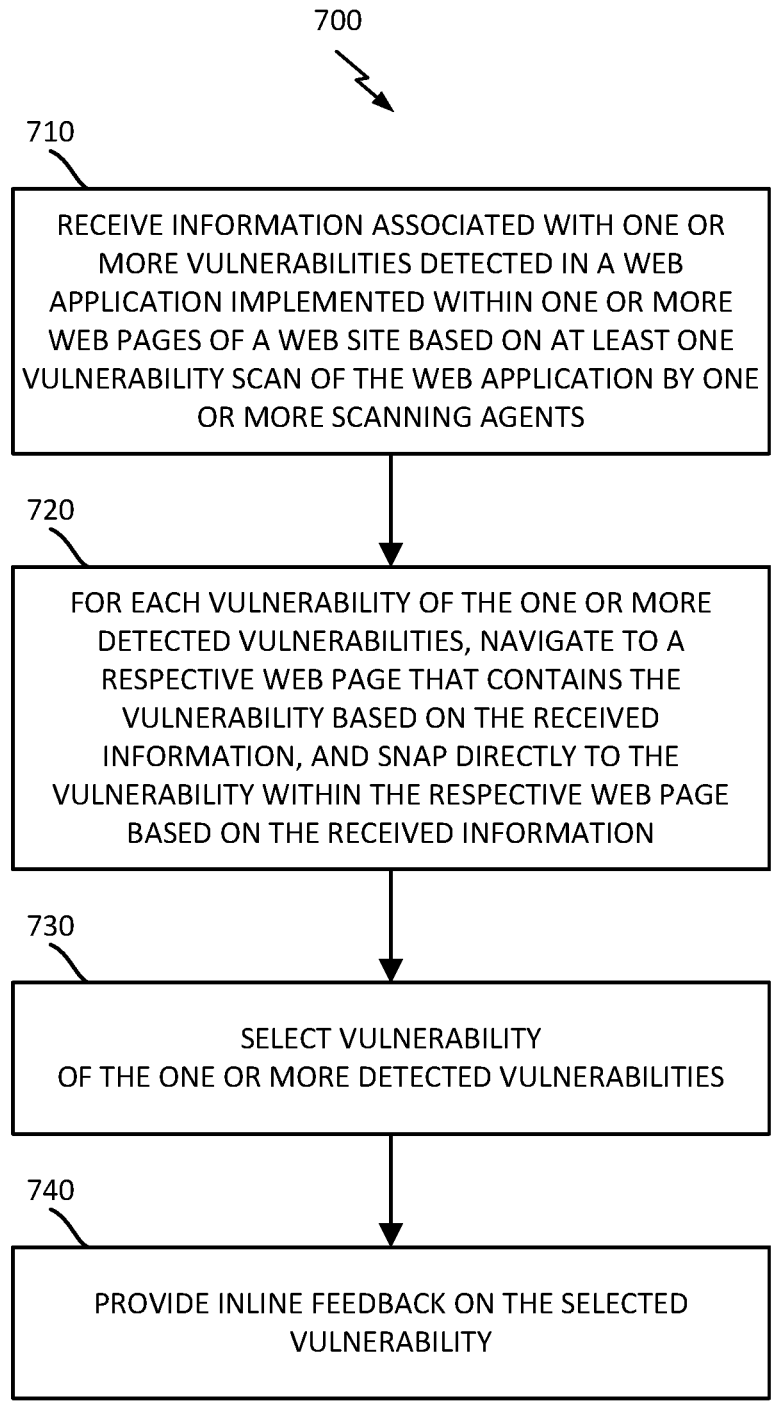
FIG. 7 illustrates an exemplary process for facilitating remediation of one or more vulnerabilities detected in a web application, according to various aspects of the disclosure.

FIG. 7 illustrates an exemplary process 700 for facilitating remediation of one or more vulnerabilities detected in a web application in accordance with one or more aspects of the disclosure. In an example, the process 700 of FIG. 7 may be performed by a browser and/or a browser extension. In particular, the process 700 may be performed by a memory and at least one processor of an apparatus (e.g., a target device) executing the browser and/or the browser extension.

At block 710, the browser and/or the browser extension may receive information associated with the one or more vulnerabilities detected in the web application based on at least one remote vulnerability scan of the web application implemented within one or more web pages of a web site by one or more scanning agents. The information may be received from a vulnerability management system 150, 250. Examples of scanning agents may include any of the cloud scanners 170, 270, active scanners 110, 210, and/or passive scanners 120, 220, WAS scanner 310, of FIGS. 1-3. The information may include, for each vulnerability (e.g., for each vulnerable element 430), any one or more of a URL, an element selector, and/or plugin ID.

At block 720, the browser and/or the browser extension may, for each vulnerability of the one or more detected vulnerabilities, navigate to a respective web page that contains the vulnerability based on the received information. Also, based on the received information, the browser and/or the browser extension may snap directly to the vulnerability within the respective web page. In so doing, the vulnerability may be visually highlighted directly within the web page that contains the vulnerability (see e.g., FIG. 4).

At block 730, the browser and/or the browser extension may select a vulnerability of the one or more detected vulnerabilities as a selected vulnerability. At block 740, the browser and/or the browser extension may provide inline feedback on the selected vulnerability. As indicated above, the inline feedback may include a description, a severity, a solution, a plugin output, or any combination thereof of the selected vulnerability. In an aspect, the received information may include the inline feedback on some or all of the one or more detected vulnerabilities.

Figure 8:
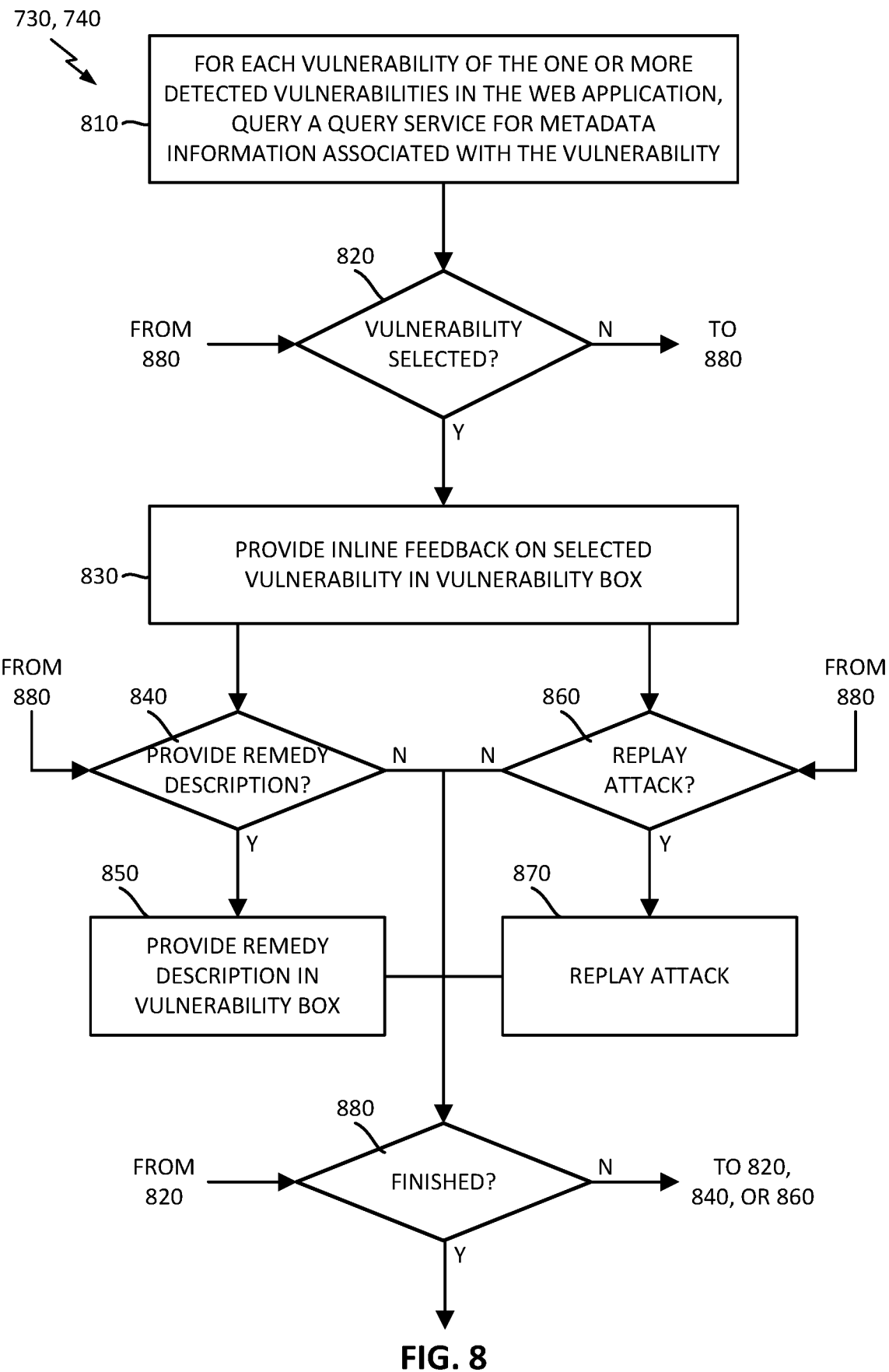
FIG. 8 illustrates an exemplary process to provide inline feedback on a selected vulnerability, according to various aspects of the disclosure.

FIG. 8 illustrates an exemplary process to implement blocks 730, 740 in accordance with one or more aspects of the disclosure. In an example, the process to implement blocks 730, 740 of FIG. 8 may be performed by a browser and/or a browser extension. In particular, the process implement blocks 730, 740 of FIG. 8 may be performed by a memory and at least one processor of an apparatus executing the browser and/or the browser extension.

At block 810, the browser and/or the browser extension may, for each vulnerability of the one or more detected vulnerabilities, query a query service (e.g., query the second cloud service 350) for metadata information associated with the vulnerability. That is, description, severity, solution, plugin output, or any combination thereof of each vulnerability (e.g., of each highlighted vulnerable element) may be queried. In an aspect, a front end of the browser and/or the browser extension may provide the element selector 317 for each of the one or more detected vulnerability to the query service (e.g., to the second cloud service 350).

At block 820, the browser and/or the browser extension may determine whether a vulnerability (e.g., one of the highlighted vulnerable elements 430) has been selected (e.g., by determining whether a cursor is hovering over the vulnerability). If so ("Y" branch from block 820), then at block 830, the browser and/or the browser extension may display the inline feedback associated with the selected vulnerability. In an aspect, the inline feedback may be provided in a vulnerability box 550 (see e.g., FIG. 5). The inline feedback displayed in the vulnerability box 550 (which may be a pop-up box), may include any one or more of a vulnerability ID 552, a vulnerability name 554, and a vulnerability description 556 associated with the selected vulnerability (e.g., selected vulnerable element 430). On the other hand, if it is determined that no vulnerability has been selected ("N" branch from block 820), then the process may proceed to block 880 described in further detail below.

In an aspect, block 810 may be performed for all detected vulnerabilities at once. In this way, when a vulnerability is selected (e.g., by the user hovering the cursor over the vulnerability), the inline feedback information can be immediately available for display in the vulnerability box. That is, the browser and/or the browser extension may query for the information on some or all of the one or more detected vulnerabilities. Alternatively, the browser and/or the browser extension may receive the information on some or all of the one or more detected vulnerabilities without querying the query service, e.g., in block 710.

In another aspect, block 810 may be performed selectively, e.g., one at a time. That is, when block 820 is performed to determine the selected vulnerability, block 810 may be performed to retrieve the inline feedback information of the selected vulnerability. In this way, traffic between the browser front end and the query service can be minimized.

At block 840, the browser and/or the browser extension may determine whether or not remedy description 562 should be provided or otherwise displayed. For example, when the remedy guidance button 560, which may be provided within the vulnerability box 550, is clicked or otherwise activated, it may be determined that the remedy description 562 should be provided. The remedy description 562 may be included in the received information from the vulnerability management system 150, 250. In particular, the inline feedback may include the remedy description 562 associated with the selected vulnerability.

If it is determined that the remedy description 562 should be provided ("Y" branch from block 840), then at block 850, the browser and/or the browser extension may provide or otherwise display the remedy description 562, e.g., within the vulnerability box 550. Thereafter, the process may proceed to block 880. On the other hand, if it is determined that the remedy description 562 is not to be provided ("N" branch from block 840), then the process may also proceed to block 880.

Alternatively, the remedy description 562 to address the selected vulnerability may automatically be provided or otherwise displayed within the vulnerability box 550 upon selection of the vulnerability in block 820. That is, in an aspect, blocks 830 and 850 may be performed together without performing block 840.

At block 860, the browser and/or the browser extension may determine whether or not an attack on the selected vulnerability and/or on the web page 420 as a whole is to be replayed. For example, when the replay button 570, which may be provided within the vulnerability box 550, is clicked or otherwise activated, it may be determined that the attack should be replayed.

If it is determined that the attack should be replayed ("Y" branch from block 860), then at block 870, the browser and/or the browser extension may replay the attack. In an aspect, the browser and/or the browser extension may be configured to generate an attack script and run the attack script. In another aspect, the attack script may be included in the received information from the vulnerability management system 150, 250. In particular, the inline feedback may include the attack script associated with the selected vulnerability. Thereafter, the process may proceed to block 880. On the other hand, if it is determined that the attack should not be replayed ("N" branch from block 860), then the process may also proceed to block 880.

At block 880, the browser and/or the browser extension may determine whether or not process to implement blocks 730, 740 is finished. If so ("Y" branch from block 880), the process may be determined to be finished. If not ("N" branch from block 880), then the process may proceed to any of the blocks 820, 840, or 860. For example, if the user selects another vulnerability (e.g., by hovering the cursor over that vulnerability), then the process may proceed to block 820 from block 880. If the user activates the remedy guidance button 560, then the process may proceed to block 840 from block 880. If the user activates the replay button 570, then then the process may proceed to block 860 from block 880.

Figure 9:
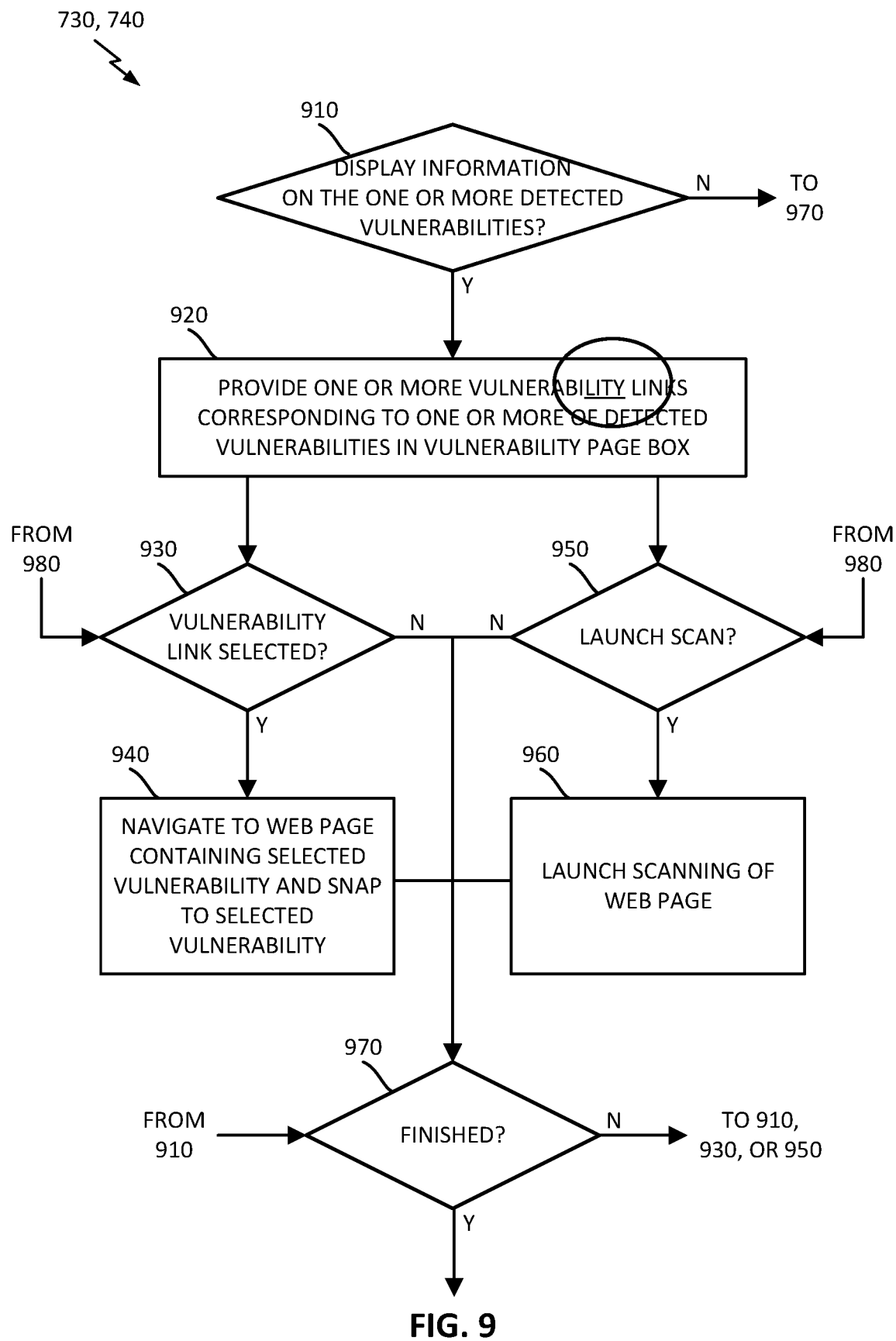
FIG. 9 illustrates another exemplary process to provide inline feedback on a selected vulnerability, according to various aspects of the disclosure.

FIG. 9 illustrates another exemplary process to implement blocks 730, 740 in accordance with one or more aspects of the disclosure. In an example, the process to implement blocks 730, 740 of FIG. 9 may be performed by a browser and/or a browser extension. In particular, the process implement block 730 of FIG. 9 may be performed by a memory and at least one processor of an apparatus executing the browser and/or the browser extension.

At block 910, the browser and/or the browser extension may determine whether or not to display the vulnerability page box 680. More generally, the browser and/or the browser extension may determine whether or not to display information on the one or more detected vulnerabilities of the web page. In an aspect, when the vulnerabilities button 440, which may be provided in the top portion 410 (and thus, always visible), is clicked or otherwise activated, it may be determined that the information on the one or more detected vulnerabilities is to be displayed.

If it is determined that information is to be displayed ("Y" branch from block 910), then at block 920, the browser and/or the browser extension may provide one or more vulnerability links 687 linked to the one or more detected vulnerabilities. In an aspect, the browser and/or the browser extension may generate the one or more links based on the information received from the vulnerability management system 150, 250. Alternatively or in addition thereto, the one or more links may be included in the received information. The one or more vulnerability links 687 may be displayed in the vulnerability page box 680 (e.g., see FIG. 6). On the other hand, if it is determined that information is not to be displayed ("N" branch from block 910), then the process may proceed to block 970 described in further detail below.

At block 930, the browser and/or the browser extension may determine whether one of the vulnerability links 687 has been selected. For example, as the cursor is hovered over one of the vulnerability links 687, that vulnerability link 687 may be highlighted (e.g., through underlining). The highlighted vulnerability link 687 may be deemed as being selected when it is clicked or otherwise activated, and the corresponding vulnerability (e.g., corresponding vulnerable element 430) may be deemed as the selected vulnerability.

If it is determined that a vulnerability link 687 has been selected ("Y" branch from block 930), then at block 940, the browser and/or the browser extension may navigate to a web page that contains the selected vulnerability and snap directly to the selected vulnerability such that the selected vulnerability is in view. That is, the browser interface 400 may be changed as necessary such that the selected vulnerability in view. On the other hand, if none of the vulnerability links is selected ("N" branch from block 930), then the process may also proceed to block 970.

In an aspect, after the selected vulnerability is brought into view, i.e., after block 940 is performed, the user may hover the cursor over the selected vulnerability to cause the browser and/or the browser extension to show the vulnerability box 550 with information associated with the vulnerability (e.g., see FIG. 8, blocks 820, 830). Thereafter, other blocks of FIG. 8 may be performed and/or the process may proceed to block 970.

Alternatively, after the selected vulnerability is brought into view through block 940, the browser and/or the browser extension may automatically provide the vulnerability box 550 associated with the selected vulnerability. That is, block 830 may automatically be performed after block 940. Thereafter, other blocks of FIG. 8 may be performed and/or the process may proceed to block 970.

Referring back to FIG. 9, at block 950, the browser and/or the browser extension may determine whether the web page should be rescanned for vulnerabilities, e.g., by one or more scanning agents. For example, when the scan launch button 685, which may be provided within the vulnerability page box 680, is clicked or otherwise activated, it may be determined that the web page should be rescanned.

If it is determined that the web page should be rescanned ("Y" branch from block 950), then at block 960, the browser and/or the browser extension may cause the web page to be rescanned. For example, a scan script that causes one or more scanning agents to rescan the web page, may be executed. In an aspect, the browser and/or the browser extension may generate the scan script. Alternatively or in addition thereto, the scan script may be included in the information received from the vulnerability management system 150, 260. Else ("N" branch from block 950), then the process may proceed to block 970.

While not shown in FIG. 9 (so as to reduce clutter), the browser and/or the browser extension may provide a vulnerability save button 682, e.g., within the vulnerability page box 680 (e.g., see FIG. 6). If the vulnerability save button 682 is clicked or otherwise activated, the browser and/or the browser extension may save the vulnerabilities of the web page (locally and/or remotely, e.g., in a scan DB).

At block 970, the browser and/or the browser extension may determine whether or not process to implement blocks 730, 740 is finished. If so ("Y" branch from block 970), the process may be determined to be finished. If not ("N" branch from block 970), then the process may proceed to any of the blocks 930 or 950. For example, if the user selects one of the listed vulnerabilities (e.g., by activating a highlighted listed vulnerability), then the process may proceed to block 930 from block 970. If the user activates the scan launch button 685, then the process may proceed to block 930 from block 970. If the user activates the vulnerability save button 682 (not shown), then then the process may proceed to saving the vulnerabilities of the web page as described above.

Figure 10:
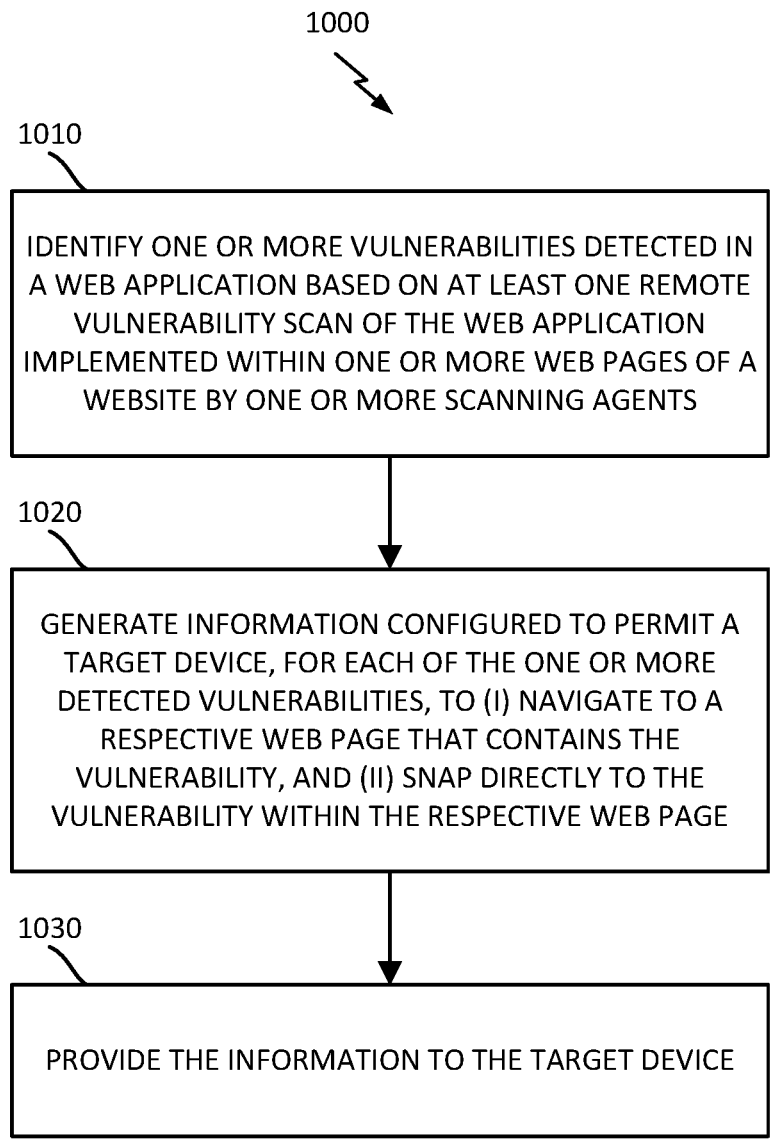
FIG. 10 illustrates another exemplary process for facilitating remediation of one or more vulnerabilities detected in a web application, according to various aspects of the disclosure.

FIG. 10 illustrates an exemplary process 1000 for facilitating remediation of one or more vulnerabilities detected in a web application in accordance with one or more aspects of the disclosure. In an example, the process 1000 of FIG. 10 may be performed by an apparatus such as a server in a network. For example, the process 1000 may be performed by a memory and at least one processor of an apparatus implementing a vulnerability management system 150, 250.

At block 1010, the apparatus may identify the one or more vulnerabilities in the web application based on at least one remote vulnerability scan of the web application implemented within one or more web pages of a web site. The vulnerabilities may be detected by one or more scanning agents. Examples of scanning agents may include any of the cloud scanners 170, 270, active scanners 110, 210, and/or passive scanners 120, 220, WAS scanner 310, of FIGS. 1-3.

At block 1020, the apparatus may generate information configured to permit a target device to perform remediation.

For example, for each of the one or more detected vulnerabilities, the generated information may permit a target device (e.g., browser and/or browser extension running on the target device) to (i) navigate to a respective web page that contains the vulnerability, and (ii) snap directly to the vulnerability within the respective web page. In block 1030, the apparatus may provide the information to the target device. The information may include, for each of some or all detected vulnerabilities, any one or more of a URL, an element selector, and/or plugin ID.

In an aspect, the information provided to the target device may comprise inline feedback associated with remediation of a respective vulnerability while snapped to the respective vulnerability. For example, for at least one of the one or more detected vulnerabilities, the inline feedback may comprise a description, a severity, a solution, a plugin output, or any combination thereof of the respective vulnerability.

The inline feedback may be provided upon receiving a query from the target device. For example, the query may include an element selector of a vulnerability selected by the target device. Note that among the information provided to the target device before receiving query may include element selectors for some or all of the one or more detected vulnerabilities.

Alternatively or in addition thereto, the information initially provided to the target device may include the inline feedback for the some or all of the one or more detected vulnerabilities. In this way, the target device need not individually query for each selected vulnerability.

For a first at least one of the one or more detected vulnerabilities, the inline feedback may comprise a vulnerability ID, a vulnerability name, a vulnerability description, or any combination thereof of the first at least one detected vulnerability. Alternatively or in addition thereto, for a second at least one of the one or more detected vulnerabilities (same or different from the first at least one detected vulnerability), the inline feedback may comprise a remedy description of the second at least one detected vulnerability. Alternatively or in addition thereto, for a third at least one of the one or more detected vulnerabilities (same or different from the first and/or the second at least one detected vulnerabilities), the inline feedback may comprise a replay script enabling the target device to replay an attack corresponding to the third at least one detected vulnerability.

The information provided to the target device may comprise one or more vulnerability links linked to some or all of the one or more detected vulnerabilities. Alternatively or in addition thereto, the information provided to the target device may comprise a scan script, which when executed, causes the one or more scanning agents to rescan the web page for vulnerabilities.

Figure 11:
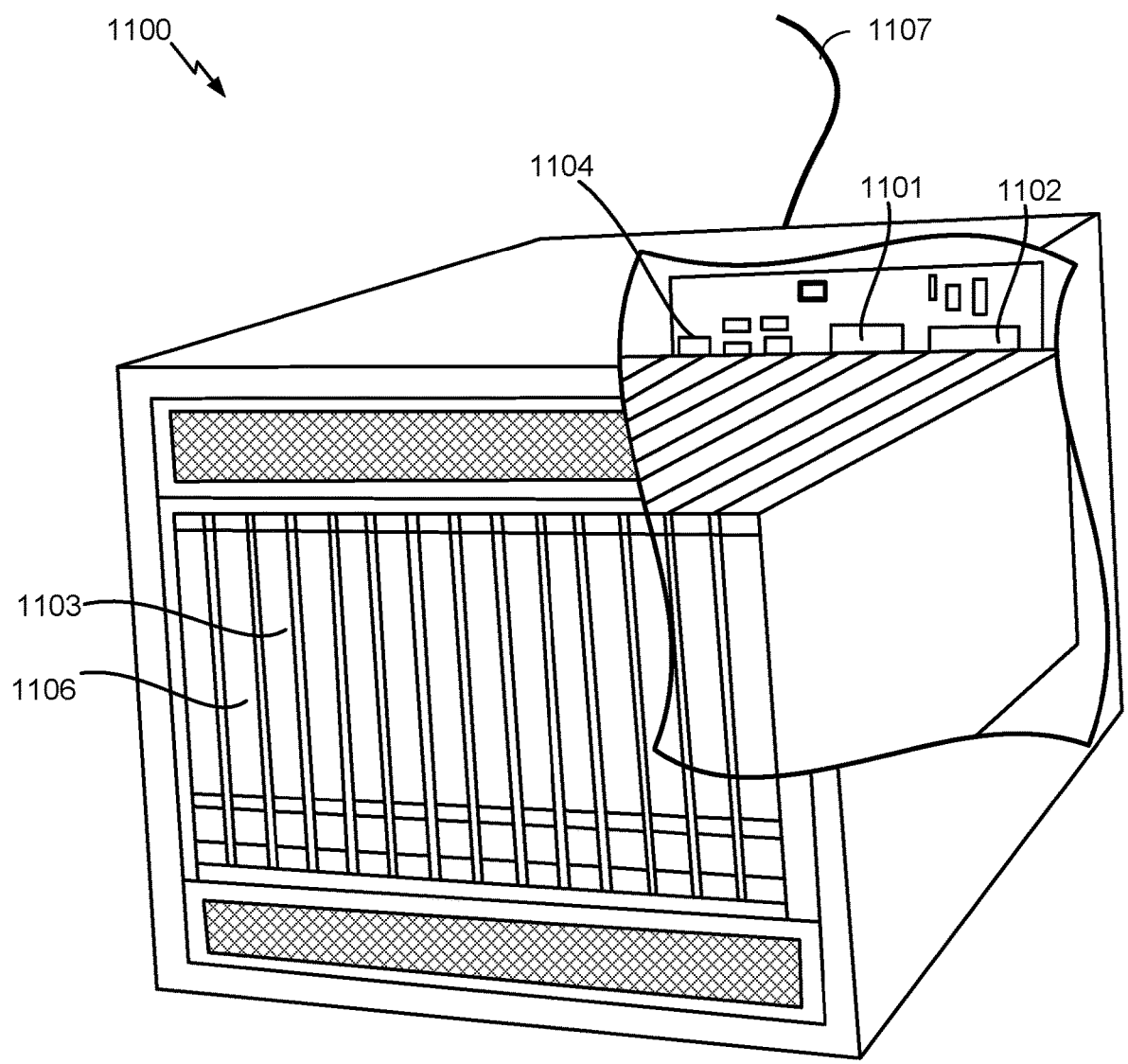
FIG. 11 illustrates an apparatus, according to various aspects of the disclosure.

The various embodiments may be implemented on any of a variety of commercially available computing devices, such as an apparatus 1100 illustrated in FIG. 11. In an example, the apparatus 1100 may correspond to one example configuration of a computing device on which applications that facilitate remediation of one or more vulnerabilities of a web application may execute, e.g., as part of a target device configured to perform the processes illustrated in FIGS. 7, 8, and 9. In another example, the apparatus 1100 may correspond to one example configuration of a computing device on which applications that facilitate remediation of one or more vulnerabilities of a web application may execute, e.g., as part of the vulnerability management system 150 of FIG. 1 or the vulnerability management system 250 of FIG. 2 configured to perform the process illustrated in FIG. 10.

In FIG. 11, the apparatus 1100 may include one or more processors 1101 coupled to volatile memory 1102 and a large capacity nonvolatile memory, such as a disk drive 1103. The apparatus 1100 may also include a floppy disc drive, compact disc (CD) or DVD disc drive 1106 coupled to the one or more processors 1101. The apparatus 1100 may also include network access ports 1104 coupled to the one or more processors 1101 for establishing data connections with a network 1107, such as a local area network coupled to other broadcast system computers and servers or to the Internet. The network access ports 1104 may be more broadly described as communicators 1104.

Figure 12:
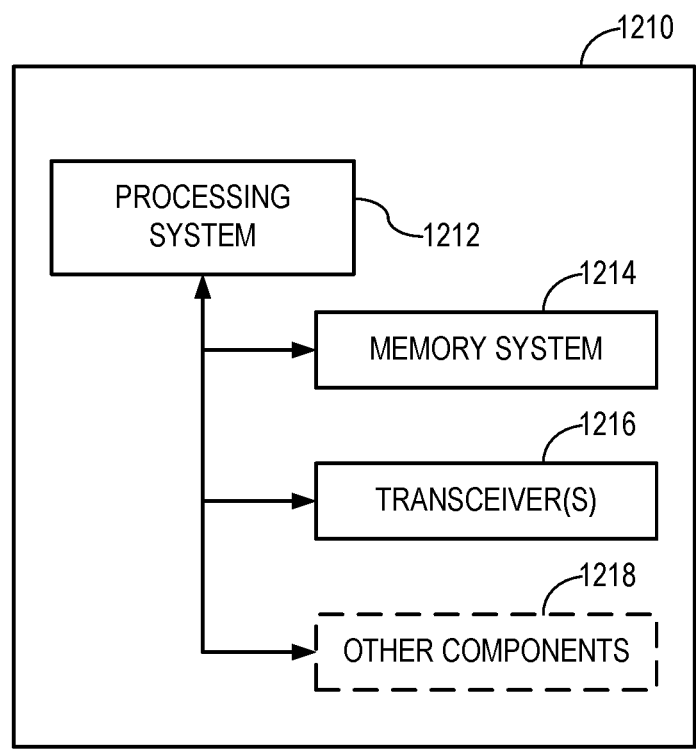
FIG. 12 illustrates a user equipment (UE) in accordance with various aspects of the disclosure.

While FIG. 11 illustrates an example whereby a server-type apparatus 1100 may implement various processes of the disclosure, such as the processes of FIGS. 7-10, in other aspects the processes of FIGS. 7-9 in particular may execute on a user equipment (UE), such as UE 1200 depicted in FIG. 12.

FIG. 12 generally illustrates a UE 1210 in accordance with aspects of the disclosure. In some designs, UE 1210 may correspond to any UE-type that is capable of executing a web browser and/or browser extension (or plug-in) for performing any of the processes of FIGS. 7-9 as described above, including but not limited to a mobile phone or tablet computer, a laptop computer, a desktop computer, a wearable device (e.g., smart watch, etc.), and so on. The UE 1210 depicted in FIG. 12 includes a processing system 1212, a memory system 1214, and at least one transceiver 1216. The UE 1210 may optionally include other components 1218 (e.g., a graphics card, various communication ports, etc.).

The processing system 1212 may include one or more microprocessors, microcontrollers, and/or digital signal processors that provide processing functions, as well as other calculation and control functionality. The memory system 1214 may be configured to store data and/or instructions for executing programmed functionality within the UE 1210. The memory system 1214 may include on-board memory that is, for example, in a same integrated circuit package as the processing system 1212. Additionally or alternatively, the memory system 1214 may include memory that is external to the processing system 1212 and functionally coupled over a common bus. The transceiver(s) 1216 may comprise wired communication interface(s) (e.g., Ethernet ports, USB ports, etc.) and/or wireless communication interface(s) (e.g., to support cellular communications, Wi-Fi communications, satellite communications, Bluetooth or NFC communications, etc.).

It will be understood that the UE 1210 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in an automotive vehicle, and/or any other device with a need for position sensing capability. As such, the UE 1210 may include any number of other components 1218.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of facilitating remediation of one or more vulnerabilities detected in a web application, the method comprising:
   receiving information associated with the one or more detected vulnerabilities based on at least one remote vulnerability scan of a web application implemented within one or more web pages of a web site by one or more scanning agents, each of the one or more detected vulnerabilities being a security vulnerability; and
   for each vulnerability of the one or more detected vulnerabilities,
      navigating to a respective web page that contains the vulnerability based on the received information, the respective web page having been determined to contain the vulnerability prior to receiving the information;
      snapping directly to the vulnerability within the respective web page based on the received information; and
      visually emphasizing the vulnerability directly within the respective web page.

2. The method of claim 1, further comprising:
   selecting a vulnerability of the one or more detected vulnerabilities as a selected vulnerability; and
   providing an inline feedback on the selected vulnerability.

3. The method of claim 2, wherein the inline feedback comprises a description, a severity, a solution, a plugin output, or any combination thereof of the selected vulnerability.

4. The method of claim 2, wherein information of the inline feedback on the selected vulnerability is queried from a query service by providing an element selector of the selected vulnerability to the query service.

5. The method of claim 4, wherein the element selector of the selected vulnerability provided to the query service comprises a CSS selector, an XPath selector, a Node number selector, a Name selector, an Id selector, and a LinkText selector, or any combination thereof.

6. The method of claim 2, wherein providing the inline feedback on the selected vulnerability comprises:

providing the inline feedback on the selected vulnerability within a vulnerability box, the inline feedback displayed in the vulnerability box comprising a vulnerability ID, a vulnerability name, a vulnerability description, or any combination thereof.

7. The method of claim 6, wherein providing the inline feedback on the selected vulnerability further comprises:
determining whether a remedy guidance button has been activated; and
providing a remedy description corresponding to the selected vulnerability when it is determined that the remedy guidance button has been activated.

8. The method of claim 6, wherein providing the inline feedback on the selected vulnerability comprises:
determining whether a replay button has been activated; and
replaying an attack on the selected vulnerability when it is determined that the replay button has been activated.

9. The method of claim 2, wherein selecting the vulnerability comprises:
determining whether a vulnerabilities button has been activated; and
providing one or more vulnerability links in a vulnerability page box, the one or more vulnerability links being linked to the one or more detected vulnerabilities.

10. The method of claim 9, wherein the vulnerabilities button is provided within a top portion of a browser interface, the top portion being unscrollable.

11. The method of claim 9, wherein selecting the vulnerability further comprises:
selecting a vulnerability as the selected vulnerability when a corresponding vulnerability link is activated; and
navigating to a web page that contains the selected vulnerability and snapping directly to the selected vulnerability when the corresponding vulnerability link is activated such that the selected vulnerability is in view.

12. The method of claim 11, wherein providing the inline feedback on the selected vulnerability comprises:
providing the inline feedback on the selected vulnerability in a vulnerability box upon snapping to the selected vulnerability within the web page.

13. The method of claim 9, wherein providing the inline feedback on the selected vulnerability further comprises:
determining whether a scan launch button has been activated; and
launching a scan so as to cause the one or more scanning agents to rescan the web page for vulnerabilities when it is determined that the scan launch button has been activated.

14. The method of claim 1, wherein the method is performed by a browser or a browser extension, the browser and/or the browser extension being configured to display the one or more web pages of the web site.

15. A method of facilitating remediation of one or more vulnerabilities detected in a web application, the method comprising:
identifying the one or more vulnerabilities in the web application based on at least one remote vulnerability scan of the web application implemented within one or more web pages of a web site by one or more scanning agents, each of the one or more detected vulnerabilities being a security vulnerability;
generating information configured to permit a target device, for each of the one or more detected vulnerabilities, to (i) navigate to a respective web page that contains the vulnerability, (ii) snap directly to the vulnerability within the respective web page, and (iii) visually emphasize the vulnerability directly within the respective web page; and
providing the information to the target device,
wherein for each of the one or more detected vulnerabilities, the respective web page is determined to contain the vulnerability prior to providing the information to the target device.

16. The method of claim 15, wherein the information provided to the target device further comprises inline feedback associated with remediation of a respective vulnerability while snapped to the respective vulnerability.

17. The method of claim 16, wherein for at least one of the one or more detected vulnerabilities, the inline feedback comprises a description, a severity, a solution, a plugin output, or any combination thereof of the respective vulnerability.

18. The method of claim 16, wherein the inline feedback is provided to the target device upon receiving a query from the target device.

19. The method of claim 18,
wherein the information provided to the target device comprises an element selector for the one or more detected vulnerabilities, and
wherein the inline feedback associated with a selected vulnerability upon receiving the query that includes the element selector of the selected vulnerability, the selected vulnerability being one of the one or more detected vulnerabilities.

20. The method of claim 19, wherein the element selector of the selected vulnerability comprises a CSS selector, an XPath selector, a Node number selector, a Name selector, an Id selector, and a LinkText selector, or any combination thereof.

21. The method of claim 16, wherein for at least one of the one or more detected vulnerabilities, the inline feedback comprises a vulnerability ID, a vulnerability name, a vulnerability description, or any combination thereof of the at least one detected vulnerability.

22. The method of claim 16, wherein for at least one of the one or more detected vulnerabilities, the inline feedback comprises a remedy description to remedy the at least one detected vulnerability.

23. The method of claim 16, wherein for at least one of the one or more detected vulnerabilities, the inline feedback comprises a replay script enabling the target device to replay an attack corresponding to the at least one detected vulnerability.

24. The method of claim 15, wherein information provided to the target device comprises one or more vulnerability links linked to the one or more detected vulnerabilities.

25. The method of claim 15, wherein information provided to the target device comprises a scan script, when executed, that causes the one or more scanning agents to rescan the web page for vulnerabilities.

26. An apparatus configured to facilitate remediation of one or more vulnerabilities detected in a web application, the apparatus comprising:
a memory; and
at least one processor coupled to the memory,
wherein the at least one processor and the memory are configured to:
receive information associated with the one or more detected vulnerabilities based on at least one remote vulnerability scan of a web application implemented within one or more web pages of a web site by one or more scanning agents, each of the one or more detected vulnerabilities being a security vulnerability; and for each vulnerability of the one or more detected vulnerabilities,
navigate to a respective web page that contains the vulnerability based on the received information, the respective web page having been determined to contain the vulnerability prior to receiving the information;
snap directly to the vulnerability within the respective web page based on the received information; and
visually emphasize the vulnerability directly within the respective web page.

27. An apparatus configured to facilitate remediation of one or more vulnerabilities detected in a web application, the apparatus comprising:
a memory; and
at least one processor coupled to the memory,
wherein the at least one processor and the memory are configured to:
identify the one or more vulnerabilities in the web application based on at least one remote vulnerability scan of the web application implemented within one or more web pages of a web site by one or more scanning agents, each of the one or more detected vulnerabilities being a security vulnerability;
generate information configured to permit a target device, for each of the one or more detected vulnerabilities, to (i) navigate to a respective web page that contains the vulnerability, (ii) snap directly to the vulnerability within the respective web page, and (iii) visually emphasize the vulnerability directly within the respective web page; and
provide the information to the target device,
wherein for each of the one or more detected vulnerabilities, the respective web page is determined to contain the vulnerability prior to providing the information to the target device.

28. A non-transitory computer-readable medium storing a non-transitory computer-readable medium storing computer-executable instructions for an apparatus configured to facilitate remediation of one or more vulnerabilities detected in a web application, the computer-executable instructions comprising:
one or more instructions causing the apparatus to receive information associated with the one or more detected vulnerabilities based on at least one remote vulnerability scan of a web application implemented within one or more web pages of a web site by one or more scanning agents, each of the one or more detected vulnerabilities being a security vulnerability; and for each vulnerability of the one or more detected vulnerabilities,
one or more instructions causing the apparatus to navigate to a respective web page that contains the vulnerability based on the received information, the respective web page having been determined to contain the vulnerability prior to receiving the information;
one or more instructions causing the apparatus to snap directly to the vulnerability within the respective web page based on the received information, and
one or more instructions causing the apparatus to visually emphasize the vulnerability directly within the respective web page.

29. A non-transitory computer-readable medium storing a non-transitory computer-readable medium storing computer-executable instructions for an apparatus configured to facilitate remediation of one or more vulnerabilities detected in a web application, the computer-executable instructions comprising:
one or more instructions causing the apparatus to identify the one or more vulnerabilities in the web application based on at least one remote vulnerability scan of the web application implemented within one or more web pages of a web site by one or more scanning agents, each of the one or more detected vulnerabilities being a security vulnerability;
one or more instructions causing the apparatus to generate information configured to permit a target device, for each of the one or more detected vulnerabilities, to (i) navigate to a respective web page that contains the vulnerability, (ii) snap directly to the vulnerability within the respective web page, and (iii) visually emphasize the vulnerability directly within the respective web page; and
one or more instructions causing the apparatus to provide the information to the target device,
wherein for each of the one or more detected vulnerabilities, the respective web page is determined to contain the vulnerability prior to providing the information to the target device.

* * * * *